(12) United States Patent
Rai et al.

(10) Patent No.: US 8,510,089 B2
(45) Date of Patent: Aug. 13, 2013

(54) COMPUTER-IMPLEMENTED SYSTEMS AND METHODS FOR FORECASTING PERFORMANCE OF POLYMER FLOODING OF AN OIL RESERVOIR SYSTEM

(75) Inventors: Khyati Rai, Sugar Land, TX (US); Arnaldo L. Espinel, Richmond, TX (US); Ganesh C. Thakur, Houston, TX (US)

(73) Assignee: Chevron U.S.A., Inc., San Ramon, CA (US)

( * ) Notice: Subject to any disclaimer, the term of this patent is extended or adjusted under 35 U.S.C. 154(b) by 203 days.

(21) Appl. No.: 12/872,923

(22) Filed: Aug. 31, 2010

(65) Prior Publication Data

US 2012/0053920 A1 Mar. 1, 2012

(51) Int. Cl.
| | |
|---|---|
| *G06G 7/48* | (2006.01) |
| *E21B 43/16* | (2006.01) |
| *E21B 43/22* | (2006.01) |
| *G01V 3/00* | (2006.01) |

(52) U.S. Cl.
USPC ........ 703/10; 166/270.1; 166/268; 370/854.6

(58) Field of Classification Search
USPC .............. 703/10; 166/270.1, 268; 340/854.6
See application file for complete search history.

(56) References Cited

U.S. PATENT DOCUMENTS

| | | | |
|---|---|---|---|
| 4,050,513 A | | 9/1977 | Wu et al. |
| 4,099,565 A | | 7/1978 | Sheely et al. |
| 4,589,489 A | | 5/1986 | Volz et al. |
| 4,811,791 A | * | 3/1989 | Harnoy et al. ............. 166/305.1 |
| 2006/0224369 A1 | | 10/2006 | Yang et al. |
| 2010/0106472 A1 | * | 4/2010 | Kaminsky et al. ................ 703/2 |
| 2010/0161292 A1 | * | 6/2010 | Shook et al. ....................... 703/2 |
| 2010/0300682 A1 | * | 12/2010 | Thakur et al. ............ 166/250.01 |
| 2011/0168391 A1 | * | 7/2011 | Saleri et al. .............. 166/250.15 |

OTHER PUBLICATIONS

Chuck Norman, NPL, "Classic Waterflooding Predictive Models", Jan. 15, 2010.*
H.L. Chang, NPL, "Polymer Flooding Technology—Yesterday, Today, and Tomorrow", 1978.*
T.F. Russell, NPL, "vol. 2: Mathematical Modeling in Water Resources", 1992.*
Noaman El-Khatib, NPL, "Waterflooding Performance of Communicating Stratified Reservoir with Log-Normal Permeability Distribution", 1999.*
PCT Application PCT/US2011/045929, filed Jul. 29, 2011, Notification of Transmittal of the International Search Report and the Written Opinion of the International Search Authority dated Dec. 26, 2011.
Chang, H. L., "Polymer Flooding Technology—Yesterday, Today, and Tomorrow," SPE-AIME, Journal of Petroleum Technology, Aug. 1978, pp. 1113-1128.

(Continued)

*Primary Examiner* — Omar Fernandez Rivas
*Assistant Examiner* — Angel Calle
(74) *Attorney, Agent, or Firm* — Jones Day

(57) ABSTRACT

Systems and methods are provided for forecasting performance of polymer flooding of an oil reservoir system. For example, property data of the oil reservoir system and polymer flooding scenario data are received. Numerical simulations are performed to generate values of an effective mobility ratio and response time for the polymer and water flooding. A correlation for the polymer flooding effective mobility ratio is determined and used in a predictive model to generate polymer and water flooding performance data, representative of oil recovery by the polymer and water flooding of the oil reservoir system.

23 Claims, 9 Drawing Sheets

(56) References Cited

OTHER PUBLICATIONS

Dake, L. P., "Fundamentals of Reservoir Engineering", Elsevier, 1978.

Datta Gupta, A., Pope, G.A., and Lake, L.W., "Heterogeneity and Mixing in Flow Through Porous Media," with Proceedings, Computational Methods in Water Resources IX, vol. 2: Mathematical Modeling in Water Resources, T.F. Russell, R.E. Ewing, C.A. Brebbia, W.G. Gray, G.F. Pinder, eds., Computational Mechanics Publications and Elsevier Science Publishers, 1992.

Dykstra, H. and Parsons, R. L., "The Prediction of Oil Recovery by Water Flood", Secondary Recovery of Oil in the United States, American Petroleum Institute, New York, 1950, 2nd Ed., pp. 160-174.

Fayers, F.J., "An Approximate Model with Physically Interpretable Parameters for Representing Viscous Fingering," SPE Reservoir Engineering, 1988, pp. 551-558.

Koval, E. J., "A Method for Predicting the Performance of Unstable Miscible Displacements," Soc. Pet. Eng. J., Jun. 1963, pp. 145-154.

Lake, Larry W., "Enhanced Oil Recovery", Prentice Hall, Published in Englewood Cliffs, N.J.1989.

Stiles, Wm. E., "Use of Permeability Distribution in Water Flood Calculations," Pet. Trans. AIME, Jan. 1949, pp. 9-13.

Todd, M.R., and Longstaff, W. J., "The Development, Testing, and Application of a Numerical Simulator for Predicting Miscible Flood Performance," J. Pet. Tech., 1972, pp. 874-882.

Waggoner, John, "The Growth of Viscous Fingers," PhD Dissertation, The University of Texas, 2000.

Yang, Z.M., Yortsos, Y.C. and Salin, Dominique, S., "Asymptotic Regimes in Unstable Miscible Displacements in Random Porous Media," Advances in Water Resources 25, 2002, pp. 885-898.

Yortsos, Y.C., "A Theoretical Analysis of Vertical Flow Equilibrium," Transport in Porous Media, 18: 107-129, 1995.

U.S. Appl. No. 12/472,920, filed on May 27, 2009, by Ganesh Thakur, et al.

PCT Application PCT/US2010/036158, filed on May 26, 2010, by Arnaldo L. Espinel, et al.

PCT International Preliminary Report on Patentability related to PCT/US2011/045929 dated Mar. 5, 2013.

* cited by examiner

COMPUTER-IMPLEMENTED SYSTEMS AND METHODS FOR FORECASTING PERFORMANCE OF POLYMER FLOODING OF AN OIL RESERVOIR SYSTEM

TECHNICAL FIELD

The present disclosure generally relates to computer-implemented systems and methods for analyzing a reservoir system, and more particularly to forecasting the performance of a reservoir system with application of a polymer flooding process.

BACKGROUND

Polymer flooding is an enhanced oil recovery technique. In a polymer flooding process, certain high-molecular-weight polymers, may be dissolved in the injection water prior to injection, to decrease water mobility and increase its viscosity so as to improve oil recovery efficiency. A polymer flooding process may facilitate a larger volume of an oil reservoir system to be contacted as compared to water flooding. Application of a polymer flooding process in heterogeneous reservoirs may result in improved vertical conformance or redistribution of injected fluids. Predictions of the performance of an oil reservoir system with application of a polymer flooding process constitute useful information for supporting analysis of project feasibility and for other purposes.

SUMMARY

As disclosed herein, computer-implemented systems and methods are provided for forecasting performance of polymer flooding of an oil reservoir system. For example, data related to properties of the oil reservoir system and data related to a polymer flooding scenario are received. Numerical simulations are performed to generate values of an effective mobility ratio for the polymer flooding. A correlation for the polymer flooding effective mobility ratio is determined and used in a polymer flooding predictive model to generate polymer flooding performance data, representative of oil recovery by the polymer flooding of the oil reservoir system.

As another example, a computer-implemented system and method having one or more data processors can be configured such that data related to properties of the oil reservoir system and data related to a polymer flooding scenario are received. Numerical simulations are performed to generate values of an effective mobility ratio for the polymer flooding. A correlation for the polymer flooding effective mobility ratio is determined as a function of a mobility ratio of the polymer flooding, a mobile oil saturation of the oil reservoir system, and a vertical permeability distribution of the oil reservoir system. The determined correlation for the polymer flooding effective mobility ratio is used in a polymer flooding predictive model to generate polymer flooding performance data, representative of oil recovery by the polymer flooding of the oil reservoir system.

As another example, a computer-implemented system and method can be configured such that data related to a water flooding scenario that precedes the polymer flooding scenario may be received. Numerical simulations may be performed to generate values of an effective mobility ratio for the water flooding. A correlation for the water flooding effective mobility ratio may be determined as a function of a mobility ratio of the water flooding and the vertical permeability distribution of the oil reservoir system. The determined correlation for the water flooding effective mobility ratio may be used in a water flooding predictive model to generate water flooding performance data, representative of oil recovery by the water flooding of the oil reservoir system. Overall performance data for the water flooding scenario and the polymer flooding scenario can be generated based on the generated water flooding performance data, a begin time of the polymer flooding, and the generated polymer flooding performance data.

As another example, a computer-implemented system and method can be configured such that a response time can be taken into account for the overall performance data of the oil reservoir system with application of the water flooding scenario and the polymer flooding scenario. Numerical simulations may be performed based on the received data related to properties of the oil reservoir system and data related to a polymer flooding scenario to generate values of a response time for the polymer flooding. A correlation for the polymer flooding response time may be determined as a function of a mobility ratio of the polymer flooding, a mobile oil saturation of the oil reservoir system, and a vertical permeability distribution of the oil reservoir system. A predicted response time for polymer flooding may be calculated based on the determined correlation for the polymer flooding response time. Overall performance data for the water flooding scenario and the polymer flooding scenario may be generated based on the generated water flooding performance data, the generated polymer flooding performance data, a begin time of the polymer flooding and the predicted polymer flooding response time.

DETAILED DESCRIPTION

Figure 1:
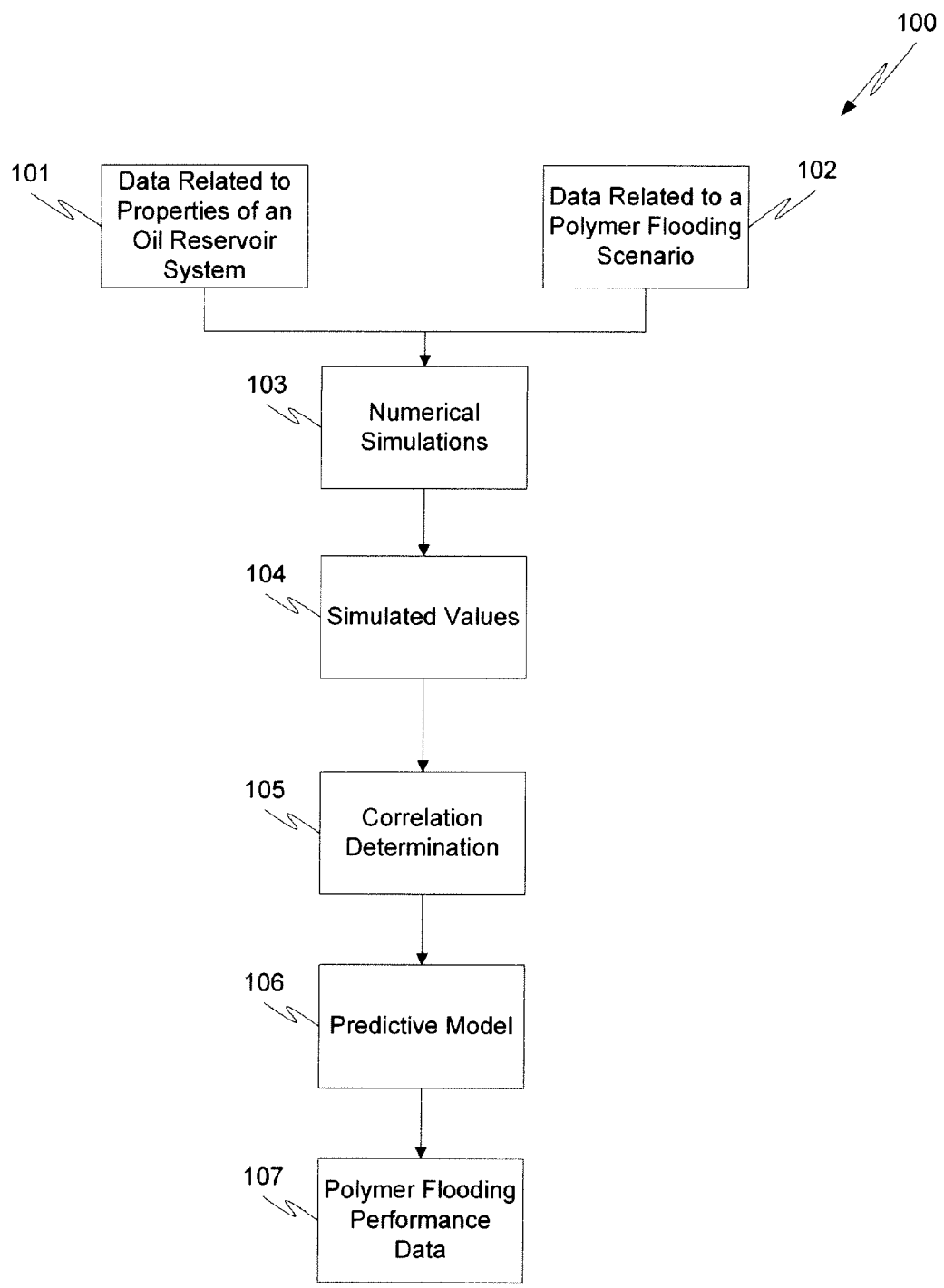
FIG. 1 depicts a flow chart of an example method for forecasting performance of polymer flooding of an oil reservoir system.

FIG. 1 depicts at 100 a method for analyzing polymer flooding for an oil reservoir system. The method 100 provides predictions of oil recovery for polymer flooding of an oil reservoir system. The predictions can be useful for many different situations, such as obtaining an estimate of polymer flood performance (e.g., estimates for recovery efficiency, volumetric sweep efficiency, oil cut, and average oil saturations as a function of time, etc.).

As shown in FIG. 1, data related to properties of an oil reservoir system 101 and data related to a polymer flooding scenario 102 are received for numerical simulations 103. The numerical simulation results 104 are then used to determine correlations at 105 for parameters of polymer flooding. For example, a correlation for an effective mobility ratio of polymer flooding can be determined at 105 as a function of mobility ratio of the polymer flooding, mobile oil saturation of the oil reservoir system, and vertical permeability distribution of the oil reservoir system. The determined correlations are imported into a predictive model at 106 to generate performance data of polymer flooding of an oil reservoir system at 107.

Figure 2:
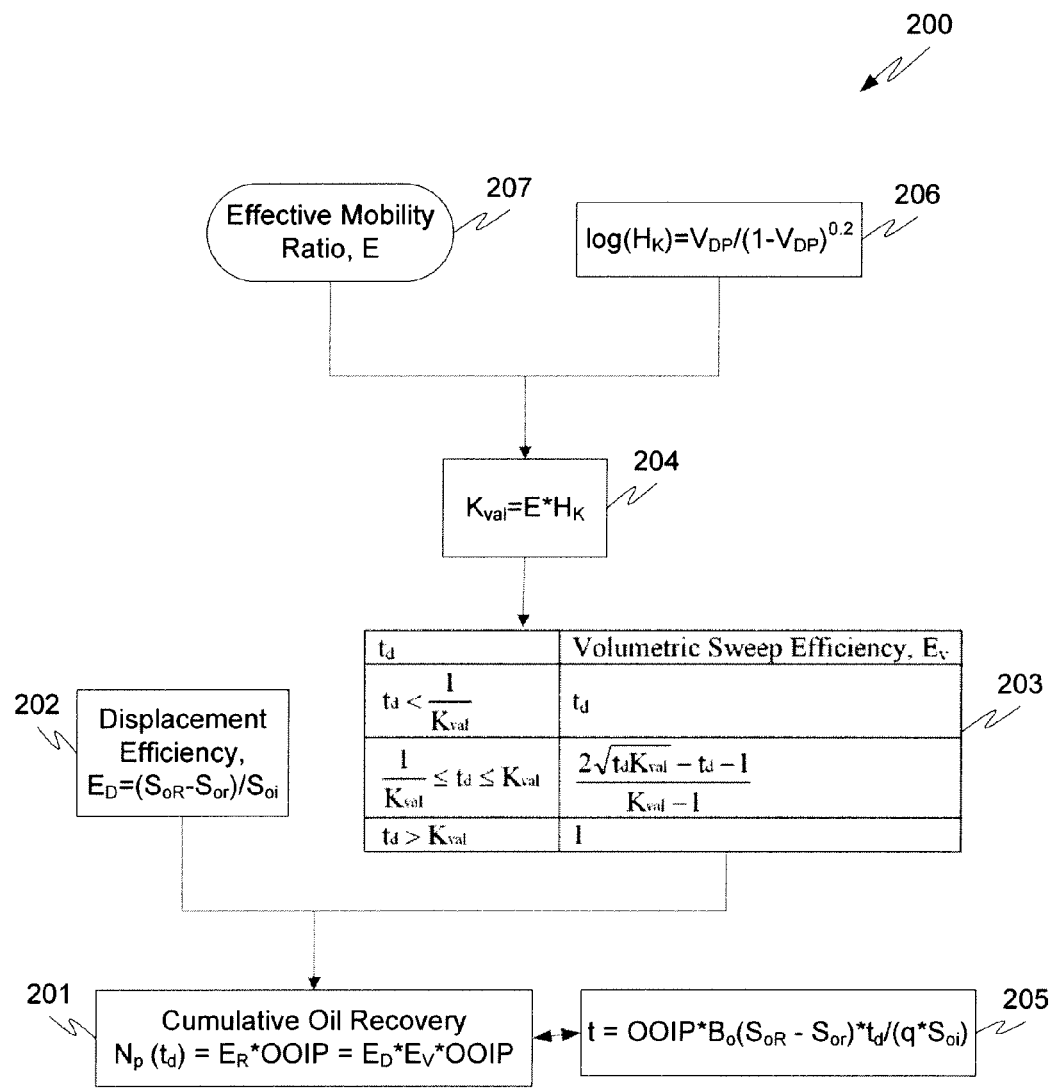
FIG. 2 depicts an example of a predictive model for polymer flooding of an oil reservoir system.

In one embodiment, a predictive model can be developed for polymer flooding of an oil reservoir system using the Koval theory. The Koval theory, in general, is discussed in such references as "A Method for Predicting the Performance of Unstable Miscible Displacements," Koval, E. J., Soc. Pet. Eng. J., June 1962, pp. 145-154. FIG. 2 depicts at 200 an example of the construction of such a predictive model.

As shown in FIG. 2, the predictive model can implement various equations to calculate cumulative oil recovery. In this example, cumulative oil recovery ($N_p$) is expressed as follows as a function of time:

$$N_p = N_p(t) \tag{1}$$

The cumulative oil recovery $N_p$ can be calculated at 201 based on parameters, such as displacement efficiency $E_D$ as shown at 202 and volumetric sweep efficiency $E_V$ as shown at 203. The Koval equation as shown at 204 can be used for the calculation of the volumetric sweep efficiency $E_V$ at 203. The time scale "t" associated with the cumulative oil recovery $N_p$ may be calculated separately at 205 in FIG. 2. The following description discusses the calculation of the cumulative oil recovery $N_p$ first, and then the calculation of the time scale "t" associated with the cumulative oil recovery.

The approach to calculating the cumulative oil recovery discussed herein can be modified or augmented in many different ways. As an example, the predictive model can start from the cumulative material balance on oil as expressed by the following equation:

{Oil Present}−{Oil initial}={Cumulative oil in}−{Cumulative oil out} (2)

A similar equation could be written for other components present. When equations for all components are summed, a continuity equation results:

$$\frac{V_p \bar{S}_o - V_p S_{oR}}{B_o} = 0 - N_p \text{ or } N_p = \frac{V_p(S_{oR} - \bar{S}_o)}{B_o} \tag{3}$$

where $V_p$ is the pore volume affected by the flooding process in reservoir volumes.

$B_o$ is the formation volume factor.

$S_{oR}$ is the average oil saturation remaining at the start of the flooding process. It is a constant that is a consequence of a preceding process.

$\bar{S}_o$ is the average oil saturation in the project volume. Being a function of time, it is the principle manifestation of the stage of depletion.

$\bar{S}_o$ consists of a weighted sum of contributions from saturations in the swept and the unswept zones, $S_{or}$ and $S_{oR}$, respectively:

$$\bar{S}_o = S_{oR}(1-E_v) + S_{or}E_v \tag{4}$$

The time dependency of $\bar{S}_o$ passes to the volumetric sweep efficiency $E_v = E_v(t)$, where $0 < E_v < 1$. Combining equations (3) and (4) gives:

$$N_p = \frac{V_p(S_{oR} - S_{or})E_v}{B_o} \tag{5}$$

Equation 2 can be written in an equivalent form by dividing by original oil in place of the oil reservoir system $$OOIP = \frac{V_p S_{oi}}{B_o} \tag{6}$$

to give the following equation as shown at 201 in FIG. 2:

$$\frac{N_p}{OOIP} = \frac{N_p B_o}{V_p S_{oi}} = E_v \frac{S_{oR} - S_{or}}{S_{oi}} = E_v E_D = E_R \tag{7}$$

In equations 5-7, the formation volume factor $B_o$ (evaluated at the average reservoir pressure) is constant in keeping with the assumption of incompressible fluids and that the recovery process is a displacement. Three new quantities which are all fractions appear in equation 7:

$S_{oi}$ is the initial (at discovery) oil saturation, $E_D$ is the displacement efficiency which is the main source of process specificity through the assignment of saturations and can be calculated from $S_{oi}$, $S_{oR}$, and $S_{or}$ as shown at 202 in FIG. 2, and $E_R$ is the recovery efficiency or cumulative oil produced divided by the original oil in place, which is, in a sense, a surrogate for the average oil saturation.

As shown in equation 7 and at 201 in FIG. 2, the cumulative oil recovery can be calculated based on the displacement efficiency $E_D$ and the volumetric sweep efficiency $E_V$. It is customary to write the volumetric sweep efficiency $E_V$ as a product of areal and vertical sweep efficiencies. In the following discussion, the volumetric sweep efficiency $E_V$ is treated as though it is the vertical sweep efficiency, saving further corrections as needed.

The model can be applied to different types of displacements. As an example, a constant mobility displacement in a uniformly layered reservoir is discussed here. The fraction of the displacing agent crossing a cross-section at given position between injector and producer is:

$$F_n = \frac{\sum_{i=1}^{i=n}(kh)_i}{\sum_{i=1}^{i=N_L}(kh)_i} \tag{8}$$

Equation 8 defines a flow capacity. Similarly, a storage capacity is $$C_n = \frac{\sum_{i=1}^{i=n}(\phi h)_i}{\sum_{i=1}^{i=N_L}(\phi h)_i} \quad (9)$$

In equations 8 and 9:

$k_i$ is the permeability of the $i^{th}$ layer, $\phi_i$ is the porosity of the $i^{th}$ layer, $h_i$ is the thickness of the $i^{th}$ layer, n is the layer in which the displacing agent is just breaking through at the cross-section, and $N_L$ is the total number of layers.

A plot of $F_n$ vs. $C_n$ is called a Lorenz curve, an F-Phi curve or a flow-storage (F-C) curve. It is a basic representation of heterogeneity in a reservoir system. F-C may be calculated from core data, or from correlations of permeability from log data. The F-C curve has a resemblance to the fractional flow curve using the Welge modification of the Buckley-Leverett theory as discussed in "Enhanced Oil Recovery," Lake, Larry W., Prentice Hall, 1989. There, the average water saturation in a one-dimensional displacement is $$\overline{S_w} = S_w|_{x=L} - \frac{f_w|_{x=L} - 1}{t_d} \quad (10)$$

where $t_d$ is a dimensionless time. $S_{w|x=L}$ and $f_{w|x=L}$ are water saturations, and fractional flows evaluated at the end of an one-dimensional medium. The producer is at x=L.

An analogy can be made between the flow capacity F and the water fractional flow, storage capacity C and the water saturation. The dimensionless time is discussed further below. With this identification, the volumetric sweep efficiency is analogous to the average water saturation:

$$E_v = \overline{C} = C_{x=L} - \frac{F|_{x=L} - 1}{t_d} \quad (11)$$

Given F=F(C), it is possible to calculate $E_v = E_v(t_D)$ from equation 11. This approach is sometimes called the Stiles method as discussed in "Use of Permeability Distribution in Water Flood Calculations," Stiles, Wm. E., Pet. Trans. AIME, January 1949, pp. 9-13. However, this process is laborious, requires core data, and can be time-consuming.

As discussed in "Enhanced Oil Recovery," Lake, Larry W., Prentice Hall, 1989, the F-C curve can be parameterized with a single parameter as:

$$F = \frac{1}{1 + \frac{1}{H_k}\frac{1-C}{C}} \quad (12)$$

where $H_K$ is the Koval heterogeneity factor.

Equation 12 is formally equivalent to straight-line relative permeability functions with zero residual phase saturations. In this instance equations 11 and 12 can be solved as:

$$E_v = \begin{cases} t_d & t_d < \frac{1}{H_K} \\ \frac{2\sqrt{t_d H_K} - t_d - 1}{H_K - 1} & \frac{1}{H_K} \leq t_d \leq H_K \\ 1 & t_d > H_K \end{cases} \quad (13)$$

Note that breakthrough time $$\left(\text{when } t_d = \frac{1}{H_K}\right)$$

decreases as heterogeneity $H_K$ increases; sweep out time (when $t_d = H_K$) increases and the sweep efficiency $E_v$ at any time decreases with increasing heterogeneity.

As shown at 206 in FIG. 2, a relation between a standard measure of heterogeneity—the Dykstra-Parsons coefficient $V_{DP}$, and $H_K$ can be given empirically by:

$$\log_{10} H_K = \frac{V_{DP}}{(1 - V_{DP})^{0.2}} \quad (14)$$

In "The Prediction of Oil Recovery by Waterflood," Dykstra, Herman and Parsons, R. L., in *Secondary Oil Recovery in the United States*, Drilling and Producers Practices, 1950, correlations of $E_v$ are given as a function of time, $V_{DP}$ and mobility ratio M. This approach requires a graphical solution and is based on non-communicating layers or layers that communicate only through the injection and production wells. On the other hand, for perfect communication of layers, known as vertical equilibrium (VE) or quasi-static flow, the results are easier to calculate than no communication because much of the above development carries over directly.

Under VE, equation 12 becomes:

$$F = \frac{1}{1 + \frac{1}{MH_k}\frac{1-C}{C}} \quad (15)$$

where M is the mobility ratio and can be written as:

$$M = \frac{\lambda_{displacing}}{\lambda_{displaced}} = \frac{\left(\frac{KK_r}{\mu}\right)_{displacing}}{\left(\frac{KK_r}{\mu}\right)_{displaced}}. \quad (16)$$

With this change, equation 13 pertains as before but with $MH_K$ replacing $H_K$.

No local mixing is one of the assumptions made in calculating the volumetric sweep efficiency $E_v$. In "A Method for Predicting the Performance of Unstable Miscible Displacements," Koval, E. J., Soc. Pet. Eng. J., June 1962, pp. 145-154, the following equation is used to take the local mixing into account:

$$F = \frac{1}{1 + \frac{1}{K_{Val}} \frac{1-C}{C}} \quad (17)$$

where the Koval factor $K_{Val}$ is defined by the Koval equation as shown at 204 in FIG. 2:

$$K_{Val} = H_K E \quad (18)$$

and E is an effective mobility ratio as show at 207 in FIG. 2. This approach is often referred as the Koval theory. Using the Koval theory, $E_v$ can be calculated with the following equation as shown at 203 in FIG. 2:

$$E_v = \begin{cases} t_d & t_d < \frac{1}{H_K} \\ \frac{2\sqrt{t_d K_{Val}} - t_d - 1}{K_{Val} - 1} & \frac{1}{H_K} \le t_d \le H_K \\ 1 & t_d > H_K \end{cases} \quad (19)$$

With $E_D$ and $E_v$ being calculated as illustrated above, the cumulative oil recovery can be calculated from $E_D$ and $E_v$ using equation 7 as shown at 201 in FIG. 2.

The approach to calculating the time scale associated with the cumulative oil recovery can be modified or augmented in many different ways. As an example, two definitions of dimensionless times may be used to calculate the time scale associated with the cumulative oil recovery. The first is based on total pore volume:

$$t_d = \frac{\int_{\xi=0}^{\xi=t} q(\xi) d\xi}{V_p} \quad (20)$$

and the second is based on movable pore volumes:

$$t_d = \frac{\int_{\xi=0}^{\xi=t} q(\xi) d\xi}{V_p(S_{oR} - S_{or})} \quad (21)$$

Both definitions are for a time-varying injection/production rate q. Equation 21 is more consistent with the sweep efficiency usage discussed herein. Thus, for constant injection rate, the time scale may be calculated with the following equation as shown at 205 in FIG. 2:

$$t = \frac{V_p(S_{oR} - S_{or})}{q} t_d = \frac{OOIPB_o(S_{oR} - S_{or})}{qS_{oi}} t_d \quad (22)$$

In sum, a predictive model can be developed based on the Koval theory to predict the cumulative oil recovery $N_p$ as a function of time. As shown in FIG. 2, the predictive model can comprise the following equations:

$$N_p(t_d) = OOIP((S_{oR} - S_{or})/S_{oi}) E_v(t_d) \quad (23)$$

$$E_v = \begin{cases} t_d & t_d < \frac{1}{H_K} \\ \frac{2\sqrt{t_d K_{Val}} - t_d - 1}{K_{Val} - 1} & \frac{1}{H_K} \le t_d \le H_K \\ 1 & t_d > H_K \end{cases} \quad (24)$$

$$t = \frac{V_p(S_{oR} - S_{or})}{q} t_d = \frac{OOIPB_o(S_{oR} - S_{or})}{qS_{oi}} t_d \quad (25)$$

The predictive model based on the Koval theory can be validated against field data. As an example, the performances of nine fields chosen from literature match well with the results calculated based on equations 23-25. Injection rate, movable oil volume, and the Koval factor are the parameters varied within the following constraints during the process of history matching.

1. Injection Rate:

$$0.9(q_{prod}^{Field}) \le q \le 1.1(q_{prod}^{Field}) \frac{RB}{D},$$

when total production rates are available, $$0.6(q_{inj}^{Field}) \le q \le (q_{inj}^{Field}) \frac{RB}{D},$$

when injection rates are available.

2. Movable Oil Volume:

$$0.85(MOV^{Field}) \le MOV \le 1.15(MOV^{Field})$$

3. The Koval factor is varied independently.

It is noted that the Koval theory provides a form of effective mobility ratio for the secondary displacement of a non-WAG (water-alternating-gas) miscible solvent:

$$E = \left(0.78 + 0.22 v^{\frac{1}{4}}\right)^4 \quad (26)$$

where v is the viscosity ratio between the fluids.

However, equation 26 is not applicable for other displacements, such as polymer flooding. A new correlation can be developed for calculating the effective mobility ratio for polymer flooding at 207 in FIG. 2 for use in a predictive model, such as the predictive model discussed above, to determine the performance of a polymer flooding of an oil reservoir system.

Figure 3:
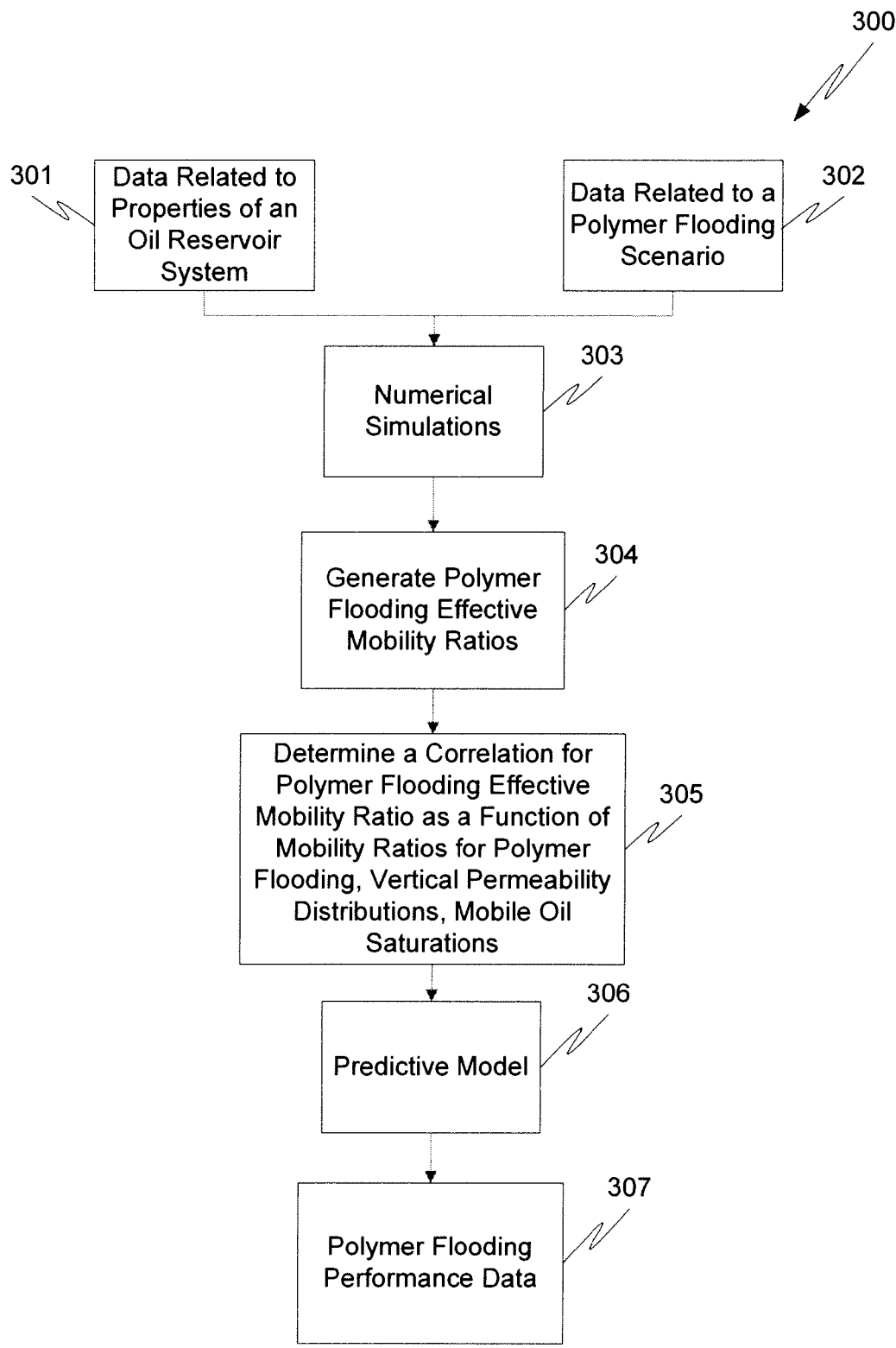
FIG. 3 depicts a flow chart of an example method for forecasting performance of polymer flooding of an oil reservoir system based on a correlation of an effective mobility ratio applicable to polymer flooding.

The approaches discussed herein can be modified or augmented in many different ways. As an example, FIG. 3 depicts at 300 a method for forecasting performance of polymer flooding of an oil reservoir system based on a correlation of an effective mobility ratio applicable to polymer flooding. Data related to properties of an oil reservoir system 301 and data related to a polymer flooding scenario 302 are received for numerical simulations 303.

Data related to a polymer flooding scenario may include data related to the properties of the polymer used in the polymer flooding of the oil reservoir system, a begin time and injection data of the polymer flooding into the oil reservoir system. Data related to properties of the oil reservoir system may include original oil saturation, remaining oil saturation, final oil saturation, original oil in place, heterogeneity factor, resident fluid viscosity, water end-point relative permeability, oil end-point relative permeability, dip angle, and an oil formation volume factor.

The numerical simulations 303 can be performed by a numerical simulator, such as the University of Texas Chemical Compositional Simulator (UTCHEM). An injection scheme that may be used as input to the numerical simulations includes an inverted 5-spot pattern, with one injector and four producers. A three-dimensional, vertically heterogeneous model may be used for the numerical simulations. The producers are operated at constant pressure constraints and the injector is operated at a constant rate constraint. Water and oil end-point mobility ratios, oil viscosity, polymer concentration and heterogeneity are varied to change the effective mobility ratio and the Dykstra-Parson's coefficient for different numerical simulation runs. Reservoir simulation models with various combinations of values of mobility ratios for polymer flooding, Dykstra Parson's coefficients and mobile oil saturations can be generated.

The results of the numerical simulations 303 can be used to generate the values of effective mobility ratios at 304. For example, the results of the numerical simulations 303 can be history matched by varying the Koval factors for the polymer flooding period. The values of effective mobility ratios can be generated at 304 using the Koval equation for the polymer flooding period. A correlation for polymer flooding effective mobility ratio can be developed by a response surface fitting of the generated values of the polymer flooding effective mobility ratio. The response surface fitting using linear regression includes linear and interaction effects.

The polymer flooding effective mobility ratio is determined to be a function of polymer mobility ratio $M_p$, mobile oil saturation $\Delta S_o$ and Dykstra Parsons' coefficient $V_{DP}$. The mobility ratio determines the fractional flow curve and recovery in dimensionless time. $V_{DP}$, which is a measure of vertical permeability contrasts in a reservoir, can be used to account for effects not considered in fractional flow theory, such as channeling, oil bypassed due to thief zones, etc. $\Delta S_o$ can be used to account for target oil in a reservoir, that can be displaced and produced through polymer flooding.

The response surface for effective mobility ratio can therefore be given as:

$$E_p = f(M_p, \Delta S_o, V_{DP}, M_p \Delta S_o, M_p V_{DP}, V_{DP} \Delta S_o)$$

As an example, the final form of the response surface for the effective mobility ratio of the polymer flooding 305 can be obtained from the response surface fitting as:

$$E_p = 13M_p - 125V_{DP} - 394\Delta S_o + 19M_p \Delta S_o - 7V_{DP}M_p + 538V_{DP}\Delta S_o + 88$$

The correlation of the polymer flood effective mobility ratio can be imported into a predictive model, such as the predictive model discussed above, to generate performance data of polymer flooding of an oil reservoir system. The performance data 307 can include recovery efficiency, volumetric efficiency, oil cut, and average oil saturations as a function of time.

Figure 4:
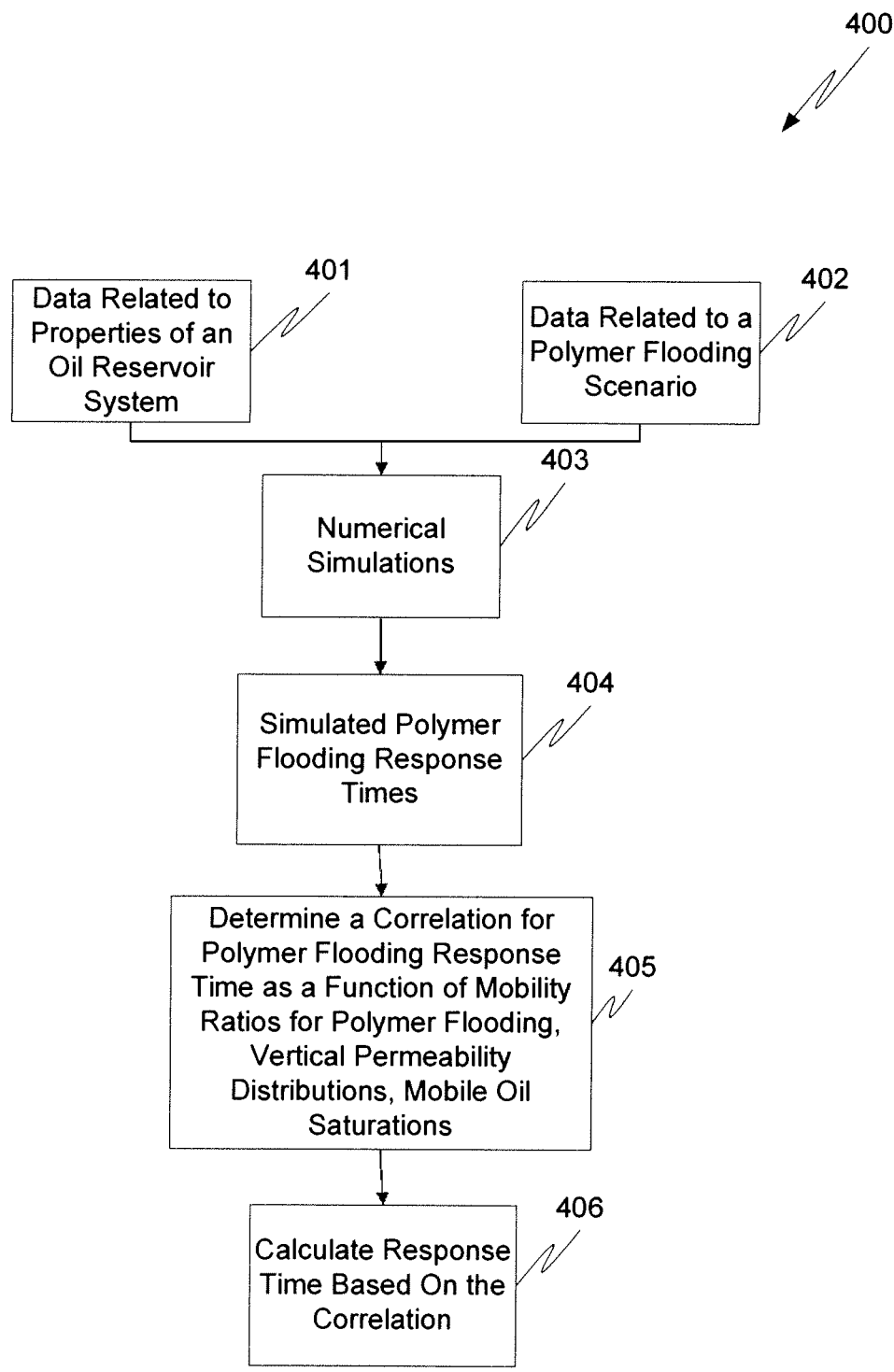
FIG. 4 depicts a flow chart of an example method for forecasting a correlation for a polymer flooding response time.

It is noted that the response to the polymer flooding may not be seen immediately at the producer wells. A response time may be used to take into account the delay in response to the polymer flooding. A correlation for a response time may be developed as a function of mobility ratio, mobile oil saturation and Dykstra Parsons' coefficient. FIG. 4 shows at 400 a method for determining a response time of polymer flooding of an oil reservoir system. Data related to properties of an oil reservoir system 401 and data related to a polymer flooding scenario 402 are received for numerical simulations 403. The response time is determined to be a function of polymer mobility ratio $M_p$, mobile oil saturation $\Delta S_o$ and Dykstra Parsons' coefficient $V_{DP}$. The response surface for the response time can therefore be given as:

$$R_s = f(M_p, \Delta S_o, V_{DP}, M_p \Delta S_o, M_p V_{DP}, V_{DP} \Delta S_o)$$

The simulated values of a response time for the polymer flooding 404 can be obtained from the numerical simulations 403. As an example, the final form of response surface for the response time 405 is obtained from the response surface fitting of the simulated values of a response time of the polymer flooding as:

$$R_s = 0.02M_p - 0.02V_{DP} - 0.07M_p\Delta S_o + 0.02V_{DP}M_p - 1.10V_{DP}\Delta S_o + 0.58$$

Therefore, a predicted response time for a polymer flooding of an oil reservoir system can be calculated from data of polymer mobility ratio, mobile oil saturation and Dykstra Parsons' coefficient $V_{DP}$ based on the determined correlation for the response time.

Figure 5:
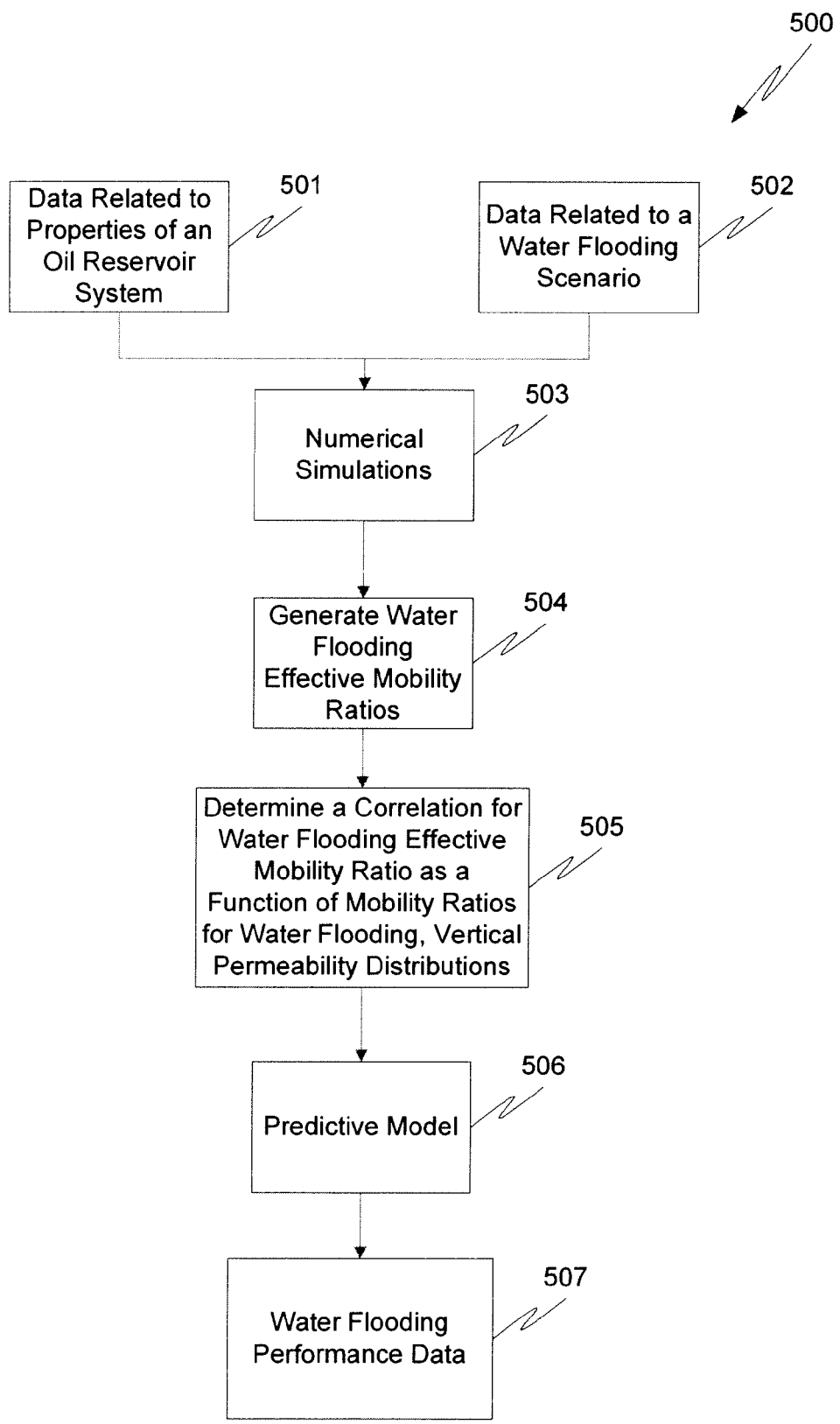
FIG. 5 depicts a flow chart of an example method for forecasting performance of water flooding of an oil reservoir system based on a correlation of an effective mobility ratio applicable to water flooding.

Since water flooding usually precedes a polymer flood, a correlation for the effective mobility ratio of water flooding may be developed for forecasting overall performance data. FIG. 5 shows at 500 a method for forecasting performance of water flooding of an oil reservoir system based on a correlation of an effective mobility ratio applicable to water flooding. Data related to properties of an oil reservoir system 501 and data related to a water flooding scenario 502 are received for numerical simulations 503. The water flooding effective mobility ratio is determined to be a function of water flooding mobility ratio $M_w$, and Dykstra Parsons' coefficient $V_{DP}$. The response surface for the effective mobility ratio of water flooding can therefore be given as:

$$E_w = f(M_w, V_{DP}, M_w V_{DP})$$

The results of these numerical simulations 503 can be used to generate values of effective mobility ratios for water flooding at 504. As an example, the final form of response surface for the effective mobility ratio of the water flooding 505 is obtained from the response surface fitting of the generated values of effective mobility ratios for water flooding as:

$$E_w = 0.6M_w - 3.8V_{DP} - 0.6V_{DP}M_w + 3.74$$

The correlation of the water flood effective mobility ratio can be imported into a predictive model, such as the predictive model discussed above, to generate performance data of water flooding of an oil reservoir system. The performance data 507 can include recovery efficiency, volumetric efficiency, oil cut, and average oil saturations as a function of time.

Based on the begin time of polymer flooding, the generated performance data of polymer flooding, and the generated performance data of the water flooding, the overall performance data of the oil reservoir system can be generated. Considering there may be a delay in the response to the polymer flooding, a response time can be taken into account for forecasting the overall performance data of the oil reservoir system.

Figure 6:
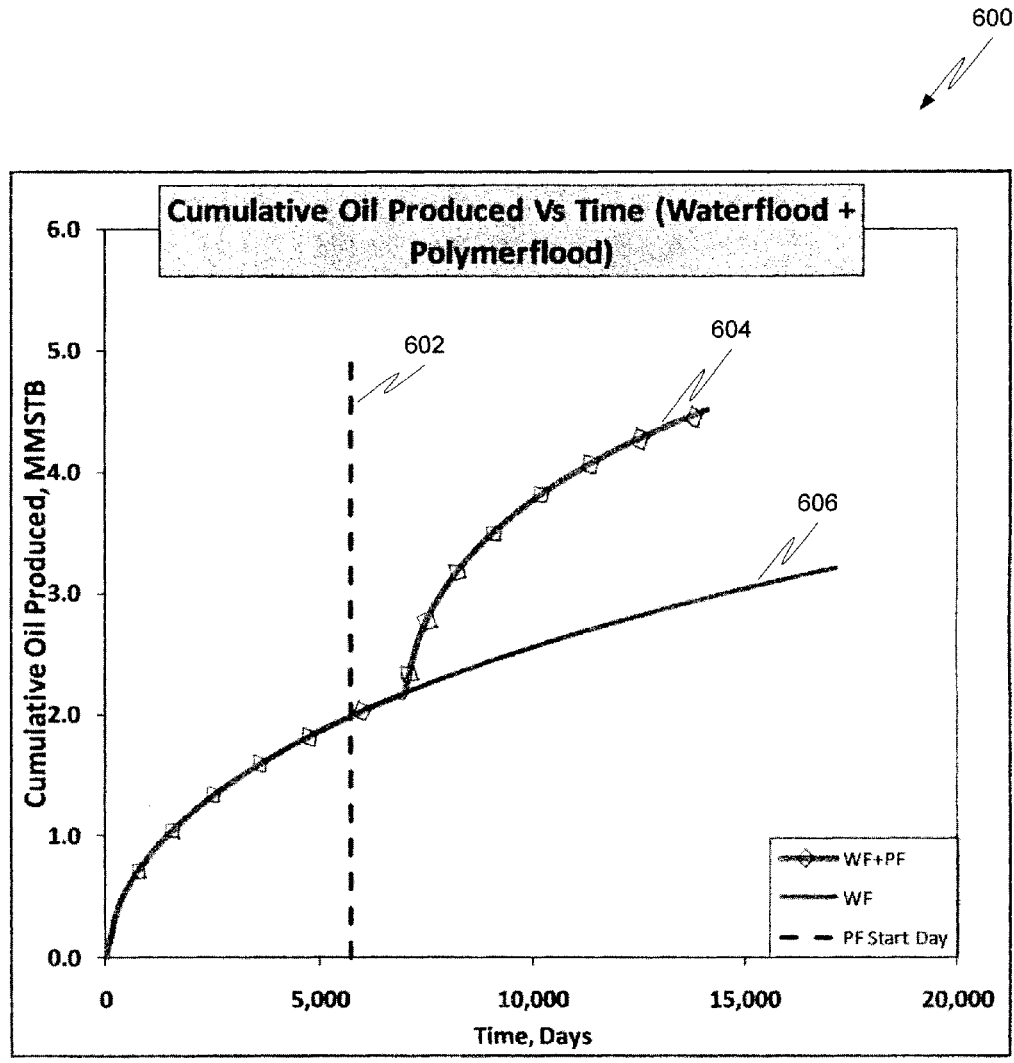
FIG. 6 shows an example of overall performance data of water flooding and polymer flooding of an oil reservoir system.

FIG. 6 provides at 600 an example of the overall performance data. More specifically, the graph of FIG. 6 depicts cumulative oil produced over time. Line 602 indicates the polymer flood start day with curve 604 illustrating the cumulative oil production for waterflood only. Curve 606 shows the increased oil production for waterflood and polymer flood.

Figure 7:
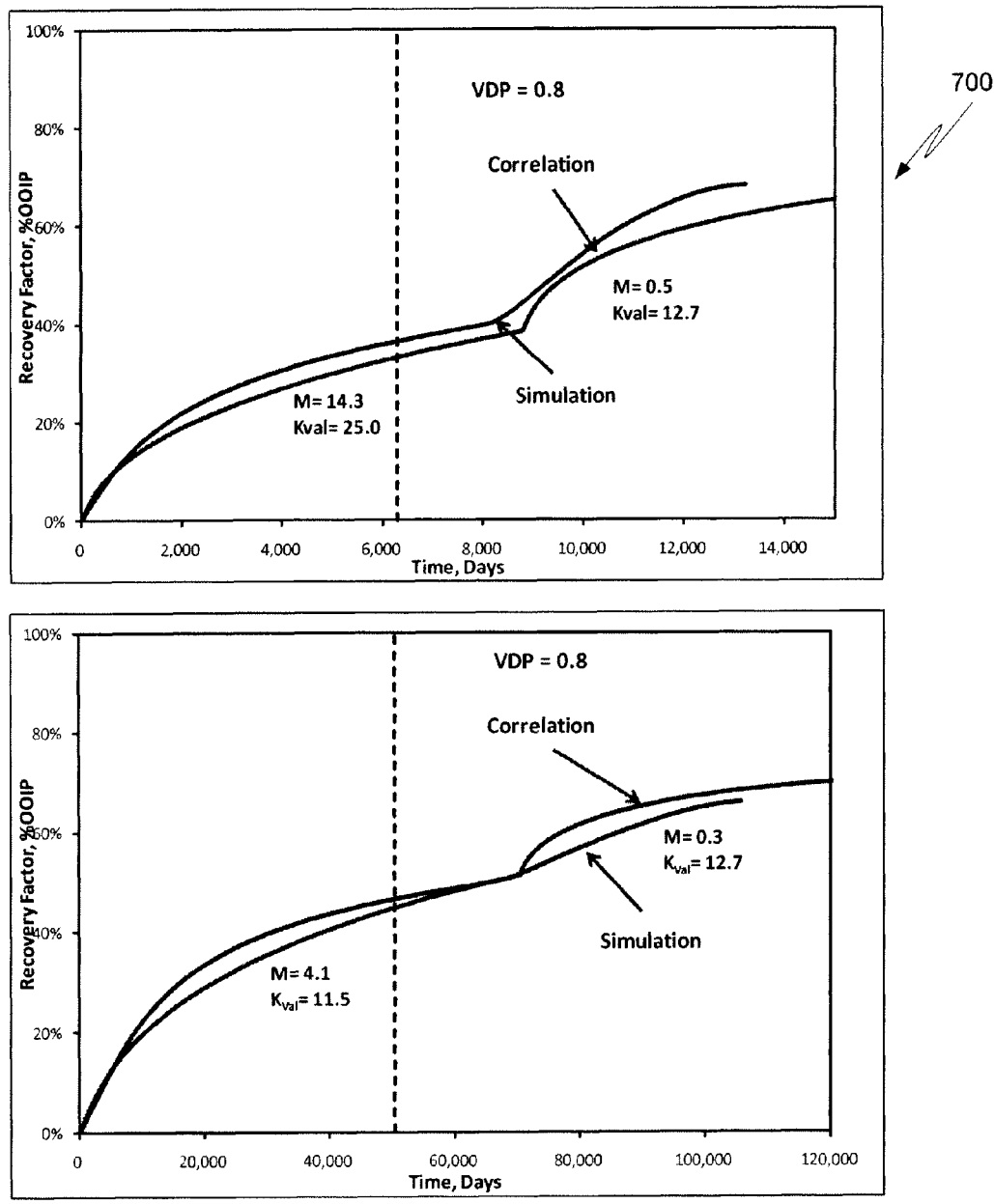
FIG. 7 shows a comparison of example performance data generated from the predictive model with the developed correlations and results of random simulation cases for validation.

The determined correlations, such as a response surface, can be tested with random simulation cases to ensure that they are applicable to cases that are widely different from the simulation cases from which the determined correlations were generated. As shown in FIG. 7, the results using the predictive model with the determined correlations match well with the simulation results of four reservoirs with properties widely different from the simulation cases from which the determined correlations were generated.

Also the results obtained from the predictive model with the correlations match well with the field production data as well. Table 1 shows several field validation results as examples.

TABLE 1

Field validation results

| Field | Error (% OOIP) |
| --- | --- |
| Courtenay | 2.1% |
| Daqing | −2.4% |
| Chateaurenard | 2.1% |
| Coalinga | −3.5% |
| Minnelusa | −5.4% |
| North Burbank | −6.0% |
| Oerrel | −2.0% |
| Sleepy Hollow | −4.0% |

Thus, the predictive model with the developed correlations provides a robust tool for obtaining an estimate of polymer flooding performance data, such as recovery efficiency, volumetric efficiency, oil cut, and average oil saturations as a function of time.

This written description uses examples to disclose the invention, including the best mode, and also to enable a person skilled in the art to make and use the invention. The patentable scope of the invention may include other examples. As an example, a computer-implemented system and method can be configured as described herein to provide results for identification of polymer flood candidates, evaluation of reservoir performance, risk predictions, and use in decision analysis. As another example, a computer-implemented system and method can be configured to allow multiple executions of the system and method. As another example, a computer-implemented system and method can be configured to provide good specificity with respect to process type such as non-thermal methods, reservoir properties, and the stage of depletion.

As another example of the wide scope of the systems and methods disclosed herein, a predictive model (e.g., the model illustrated in FIG. 2) can be based on segregated flow. Segregated flow occurs in a variety of reservoir flow types, such as heterogeneity, viscous instability, line source, coning, gravity tonguing. As a class of displacements, segregated flow involves a displacing agent displacing the resident fluid in a locally piston-like fashion. The predictive model can be applicable to dispersion-free, stable, miscible displacements or immiscible displacements. The predictive model can also account for different mobility fluids in the displacement.

Figure 8:
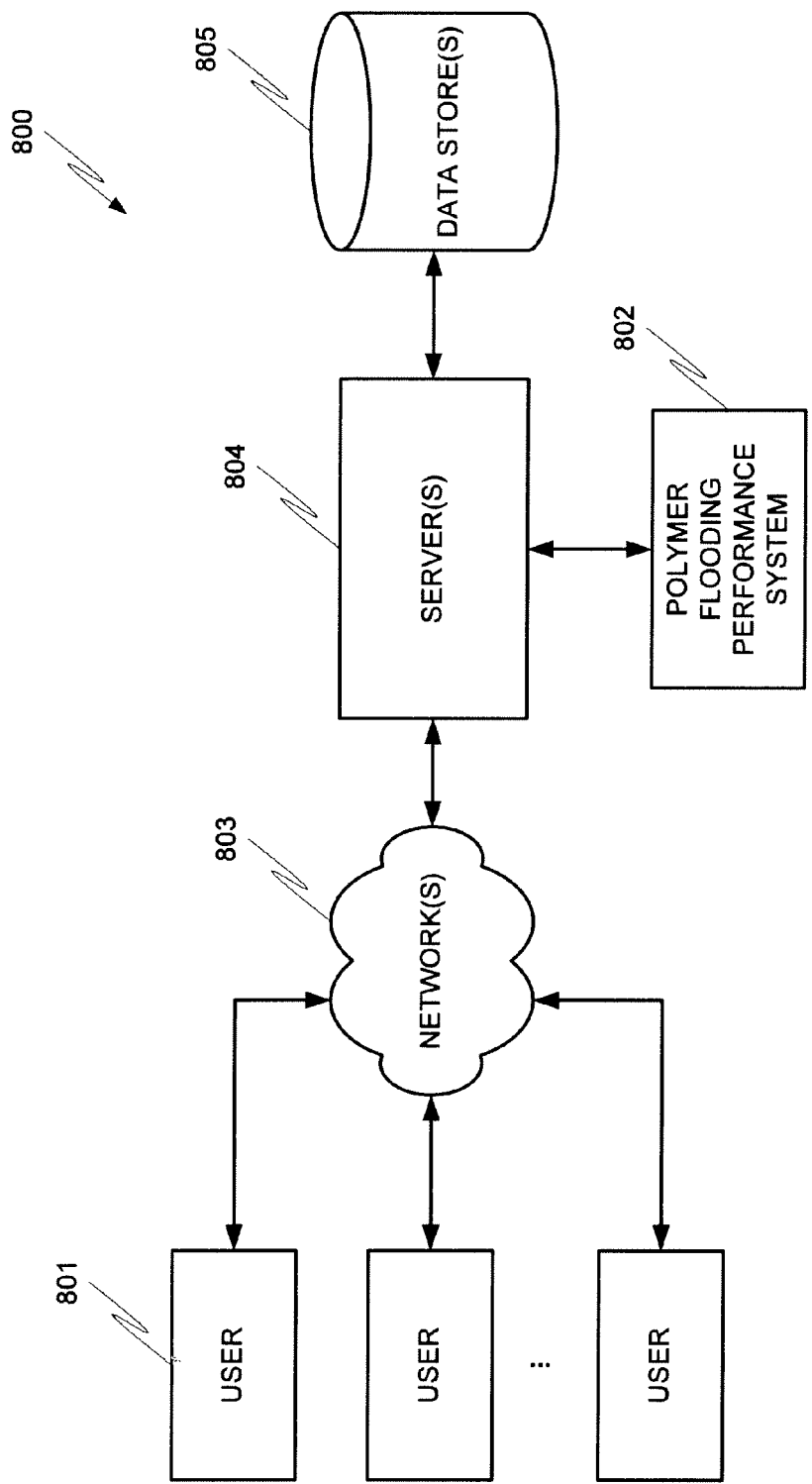
FIGS. 8 and 9 are block diagrams illustrating examples of computer-based environments within which a polymer and water flooding performance analysis system can operate.
Figure 9:
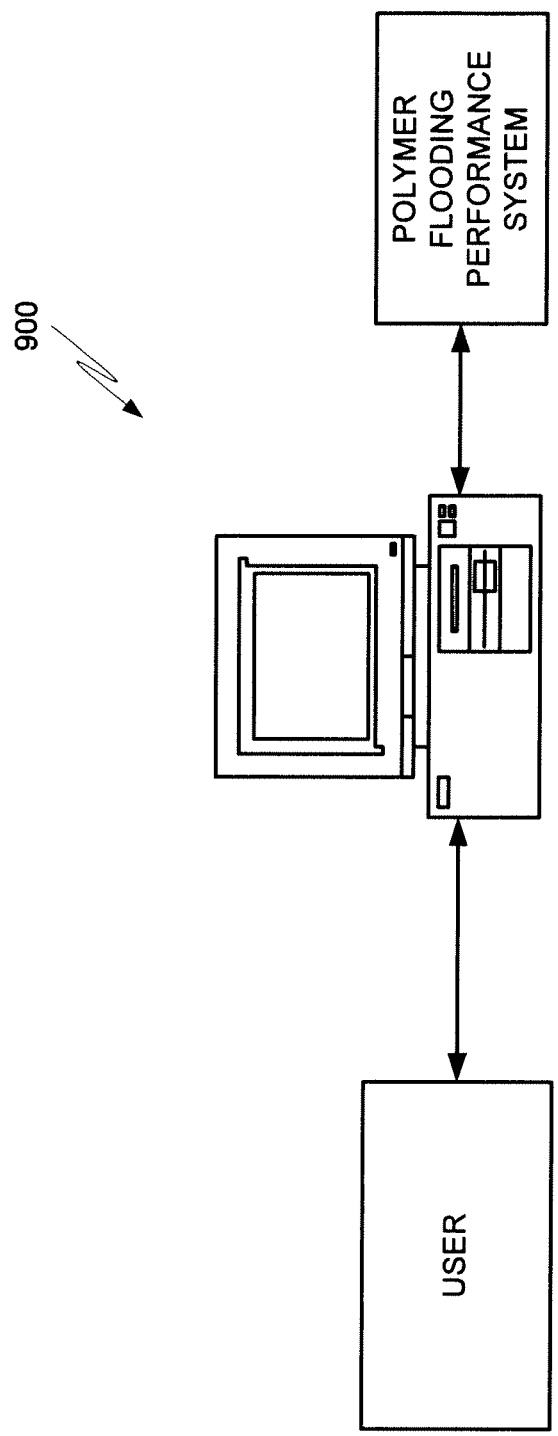

As another example, FIG. 8 depicts at 800 an environment wherein users 801 can interact with a polymer flooding performance system 802 to generate predictions of oil recovery for polymer flooding of an oil reservoir system. The users 801 can interact with the system 802 through a number of ways, such as over one or more networks 803. Server(s) 804 accessible through the network(s) 803 can host the system 802. One or more data stores 805 can store the data to be analyzed by the system 802 as well as any intermediate or final data generated by the system 802. It should be understood that a polymer flooding performance system 802 could also be provided on a stand-alone computer for access by a user, such as shown at 900 in FIG. 9.

As another example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It may be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for forecasting performance of polymer flooding of an oil reservoir system, said method comprising:

receiving, through one or more data processors, data related to properties of the oil reservoir system and data related to a polymer flooding scenario;

performing, through the one or more data processors, numerical simulations to generate values of an effective mobility ratio for the polymer flooding;

determining through the one or more data processors, a correlation for the polymer flooding effective mobility ratio as a function of a mobility ratio of the polymer flooding, a mobile oil saturation of the oil reservoir system, and a vertical permeability distribution of the oil reservoir system; and using, through the one or more data processors, the determined correlation for the polymer flooding effective mobility ratio in a polymer flooding predictive model to generate polymer flooding performance data;

wherein the generated polymer flooding performance data is representative of oil recovery by the polymer flooding of the oil reservoir system.

2. The method of claim 1, wherein the data related to the polymer flooding scenario includes: data related to properties of a polymer used in the polymer flooding of the oil reservoir system, a begin time of the polymer flooding, and injection data from the polymer flooding of the oil reservoir system;

wherein the data related to properties of the oil reservoir system includes: original oil saturation, remaining oil saturation, final oil saturation, original oil in place, heterogeneity factor, resident fluid viscosity, water endpoint relative permeability, oil end-point relative permeability, dip angle, and oil formation volume factor.

3. The method of claim 1, wherein the correlation for the polymer flooding effective mobility ratio is determined by a response surface fitting of the generated values of the effective mobility ratio for the polymer flooding, wherein the response surface fitting uses linear regression and includes linear and interaction effects.

4. The method of claim 1, wherein the generated polymer flooding performance data includes: cumulative oil recovery, recovery efficiency, volumetric efficiency, oil cut, and average oil saturations as a function of time.

5. The method of claim 4, wherein the cumulative oil recovery is calculated based on a volumetric sweep efficiency, a displacement efficiency, and original oil in place of the oil reservoir system; wherein:

the volumetric sweep efficiency is a function of a Koval factor, a pore volume of the oil reservoir system, an injection rate of the polymer flooding, and oil saturations in swept and unswept zones of the oil reservoir system in the polymer flooding scenario;

the Koval factor is equal to a product of a heterogeneity factor of the oil reservoir system and the effective mobility ratio of the polymer flooding; and the heterogeneity factor is determined from a Dykstra-Parsons' coefficient of the oil reservoir system based on an empirical correlation, the Dykstra-Parsons' coefficient being indicative of the vertical permeability distribution of the oil reservoir system.

6. The method of claim 4, wherein the recovery efficiency can be calculated by dividing the cumulative oil recovery by an original oil in place of the oil reservoir system.

7. The method of claim 1, further comprising:

receiving data related to a water flooding scenario that precedes the polymer flooding scenario;

performing numerical simulations to generate values of an effective mobility ratio for the water flooding;

determining a correlation for the water flooding effective mobility ratio as a function of a mobility ratio of the water flooding and the vertical permeability distribution of the oil reservoir system;

using the determined correlation for the water flooding effective mobility ratio in a water flooding predictive model to generate water flooding performance data;

wherein the generated water flooding performance data is representative of oil recovery by the water flooding of the oil reservoir system; and generating overall performance data for the water flooding scenario and the polymer flooding scenario based on the generated water flooding performance data, a begin time of the polymer flooding, and the generated polymer flooding performance data.

8. The method of claim 7, wherein the data related to the water flooding scenario includes data related to properties of water used in the water flooding of the oil reservoir system and injection data from the water flooding of the oil reservoir system.

9. The method of claim 7, wherein the correlation for the water flooding effective mobility ratio is determined by a response surface fitting of the generated values of the effective mobility ratio for the water flooding, wherein the response surface fitting uses linear regression and includes linear and interaction effects.

10. The method of claim 7, wherein the generated water flooding performance data includes: cumulative oil recovery, recovery efficiency, volumetric efficiency, oil cut, and average oil saturations as a function of time.

11. The method of claim 10, wherein the cumulative oil recovery is calculated based on a volumetric sweep efficiency, a displacement efficiency, and original oil in place in the oil reservoir system.

12. The method of claim 7, further comprising:

performing numerical simulations based on the received data related to properties of the oil reservoir system and data related to the polymer flooding scenario to generate values of a response time for the polymer flooding;

determining a correlation for the polymer flooding response time as a function of the mobility ratio of the polymer flooding, the mobile oil saturation of the oil reservoir system, and the vertical permeability distribution of the oil reservoir system; and calculating a predicted response time for polymer flooding based on the determined correlation for the polymer flooding response time;

wherein the overall performance data for the water flooding scenario and the polymer flooding scenario is generated based on the generated water flooding performance data, the begin time of the polymer flooding, the predicted response time for polymer flooding and the generated polymer flooding performance data.

13. The method of claim 12, wherein the overall performance data for the water flooding scenario and the polymer flooding scenario are generated by superimposing the generated water flooding performance data and the generated polymer flooding performance data based on the begin time of the polymer flooding and the predicted polymer flooding response time.

14. The method of claim 1, wherein the values of the effective mobility ratio for the polymer flooding are generated from results of the numerical simulations based on a Koval equation:

$$K_{val} = H_K \times E$$

where $K_{val}$ represents a Koval factor, $H_k$ represents a heterogeneity factor, and E represents the effective mobility ratio for the polymer flooding.

15. The method of claim 1, wherein the numerical simulations are performed under an injection scheme including an inverted five-spot pattern with one injector and four producers.

16. The method of claim 15, wherein the injector is operated at a constant-rate constraint, and the producers are operated at constant pressure constraints.

17. A computer-implemented system for forecasting performance of polymer flooding of an oil reservoir system, said system comprising:
 one or more data processors;
 a computer-readable memory encoded with instructions for commanding the one or more data processors to perform steps comprising:
  receiving data related to properties of the oil reservoir system and data related to a polymer flooding scenario;
  performing numerical simulations to generate values of an effective mobility ratio for the polymer flooding;
  determining a correlation for the polymer flooding effective mobility ratio as a function of a mobility ratio of the polymer flooding, a mobile oil saturation of the oil reservoir system, and a vertical permeability distribution of the oil reservoir system; and
  using the determined correlation for the polymer flooding effective mobility ratio in a polymer flooding predictive model to generate polymer flooding performance data;
  wherein the generated polymer flooding performance data is representative of oil recovery by the polymer flooding of the oil reservoir system.

18. The system of claim 17, wherein the instructions command the one or more data processors to perform further steps comprising:
 receiving data related to a water flooding scenario that precedes the polymer flooding scenario;
 performing numerical simulations to generate values of an effective mobility ratio for the water flooding;
 determining a correlation for the water flooding effective mobility ratio as a function of a mobility ratio of the water flooding and the vertical permeability distribution of the oil reservoir system; and
 using the determined correlation for the water flooding effective mobility ratio in a water flooding predictive model to generate water flooding performance data;
 wherein the generated water flooding performance data is representative of oil recovery by the water flooding of the oil reservoir system;
 generating overall performance data for the water flooding scenario and the polymer flooding scenario based on the generated water flooding performance data, the generated polymer flooding performance data, and a begin time of the polymer flooding.

19. The system of claim 18, wherein the instructions command the one or more data processors to perform further steps comprising:
 performing numerical simulations based on the received data related to properties of the oil reservoir system and data related to the polymer flooding scenario to generate values of a response time for the polymer flooding;
 determining a correlation for the polymer flooding response time as a function of the mobility ratio of the polymer flooding, the mobile oil saturation of the oil reservoir system, and the vertical permeability distribution of the oil reservoir system; and
 calculating a predicted response time for polymer flooding based on the determined correlation for the polymer flooding response time;
 wherein the overall performance data for the water flooding scenario and the polymer flooding scenario are generated based on the generated water flooding performance data, the generated polymer flooding performance data, the begin time of the polymer flooding, and the predicted polymer flooding response time.

20. The system of claim 19, wherein the overall performance data for the water flooding scenario and the polymer flooding scenario are generated by superimposing the generated water flooding performance data and the generated polymer flooding performance data based on the begin time of the polymer flooding and the predicted polymer flooding response time.

21. A non-transitory computer-readable storage medium encoded with instructions for commanding one or more data processors to perform a method for forecasting performance of polymer flooding of an oil reservoir system, said method comprising:
 receiving data related to properties of the oil reservoir system and data related to a polymer flooding scenario;
 performing numerical simulations to generate values of an effective mobility ratio for the polymer flooding;
 determining a correlation for the polymer flooding effective mobility ratio as a function of a mobility ratio of the polymer flooding, a mobile oil saturation of the oil reservoir system, and a vertical permeability distribution of the oil reservoir system;
 using the determined correlation for the polymer flooding effective mobility ratio in a polymer flooding predictive model to generate polymer flooding performance data;
 wherein the generated polymer flooding performance data is representative of oil recovery by the polymer flooding of the oil reservoir system.

22. The storage medium of claim 21, wherein the instructions command the one or more data processors to perform further steps comprising:
 receiving data related to a water flooding scenario that precedes the polymer flooding scenario;
 performing numerical simulations to generate values of an effective mobility ratio for the water flooding;
 determining a correlation for the water flooding effective mobility ratio as a function of a mobility ratio of the water flooding and the vertical permeability distribution of the oil reservoir system;
 using the determined correlation for the water flooding effective mobility ratio in a water flooding predictive model to generate water flooding performance data;
 wherein the generated water flooding performance data is representative of oil recovery by the water flooding of the oil reservoir system;
 generating overall performance data for the water flooding scenario and the polymer flooding scenario based on the generated water flooding performance data, the generated polymer flooding performance data, and a begin time of the polymer flooding.

23. The storage medium of claim 22, wherein the instructions command the one or more data processors to perform further steps comprising:
 performing numerical simulations based on the received data related to properties of the oil reservoir system and data related to the polymer flooding scenario to generate values of a response time for the polymer flooding;

determining a correlation for the polymer flooding response time as a function of the mobility ratio of the polymer flooding, the mobile oil saturation of the oil reservoir system, and the vertical permeability distribution of the oil reservoir system;

calculating a predicted response time for polymer flooding based on the determined correlation for the polymer flooding response time;

wherein the overall performance data for the water flooding scenario and the polymer flooding scenario are generated based on the generated water flooding performance data, the generated polymer flooding performance data, the begin time of the polymer flooding, and the predicted polymer flooding response time.

* * * * *